United States Patent Office 3,054,513
Patented Sept. 18, 1962

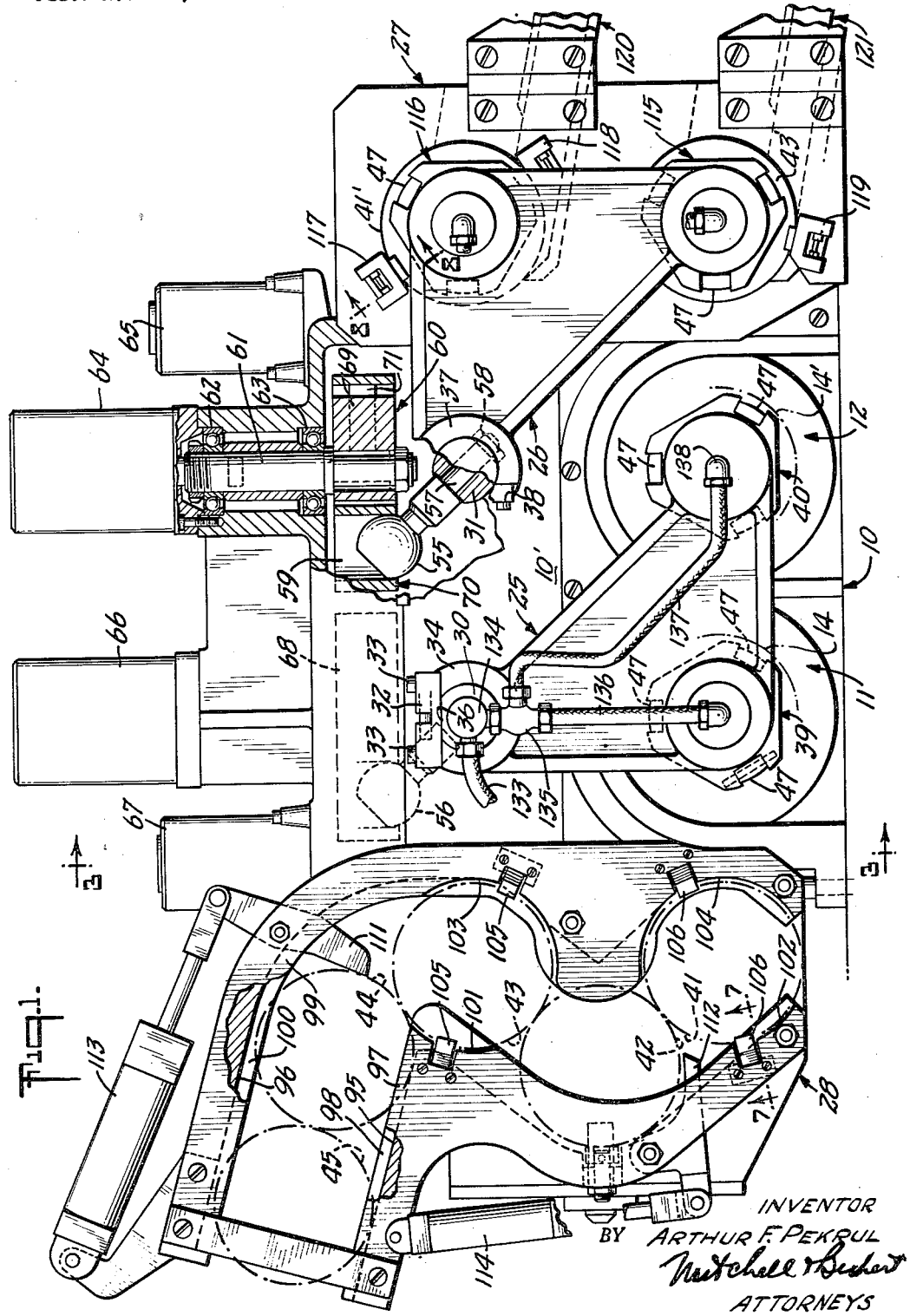

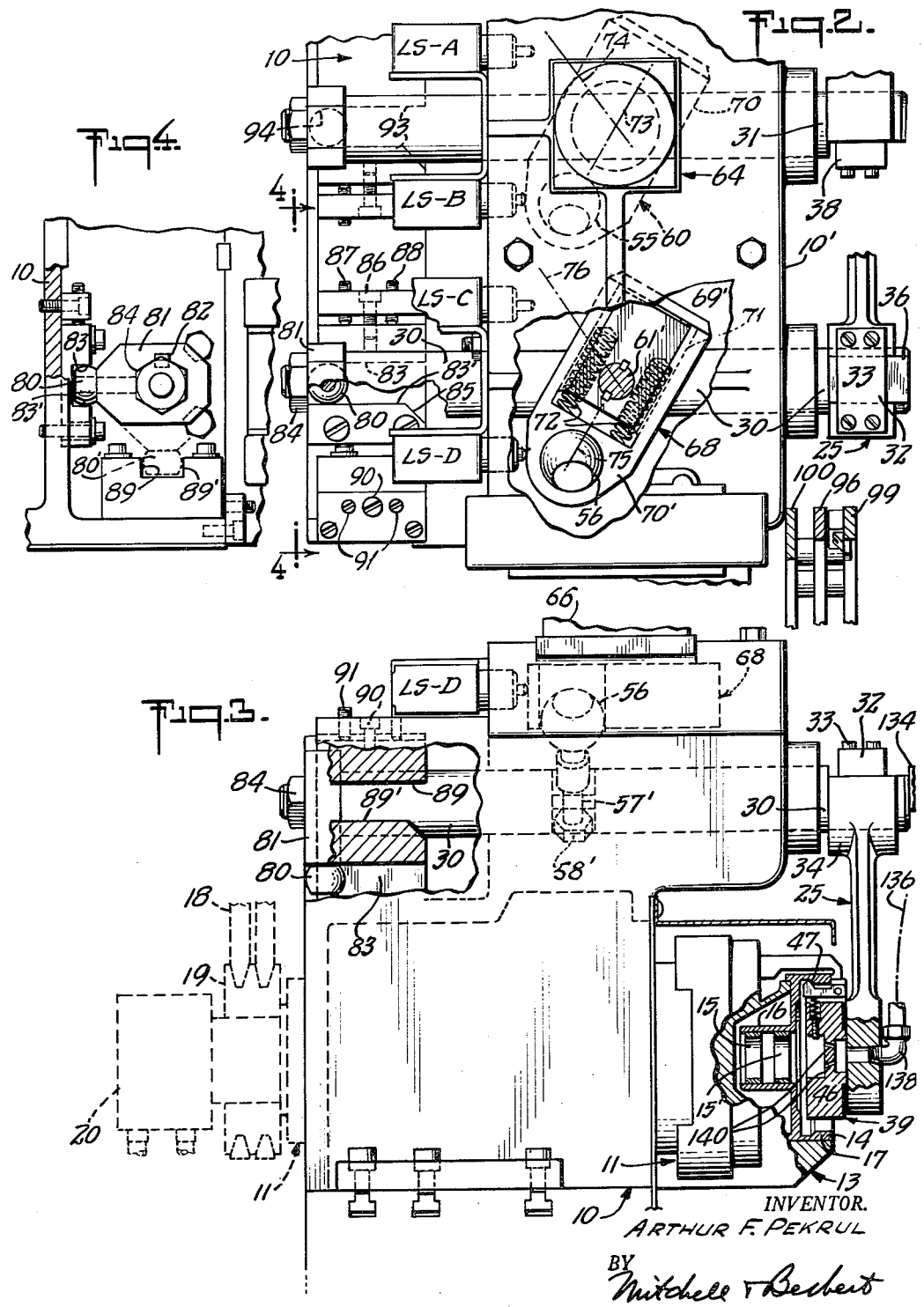

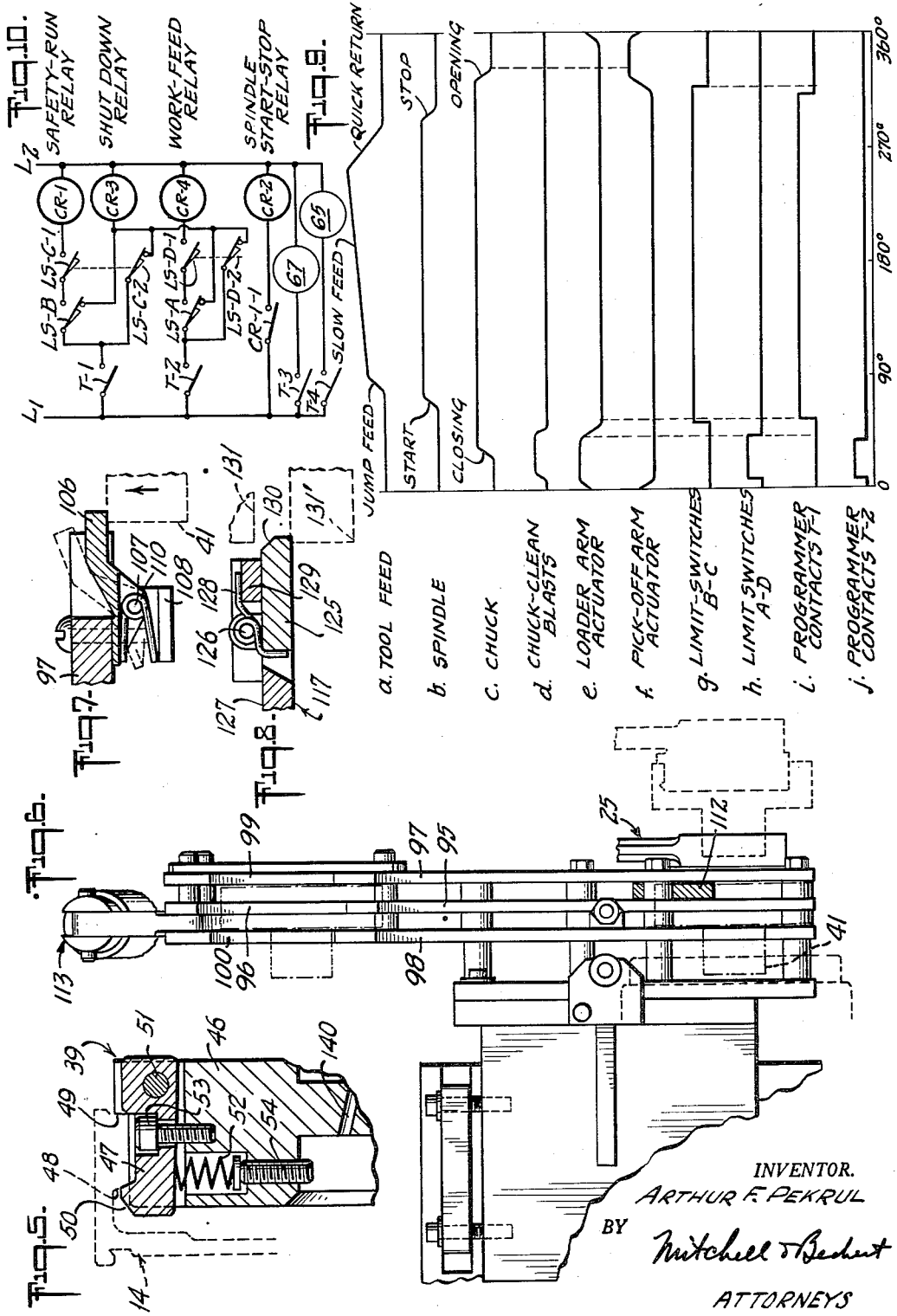

3,054,513
WORK-TRANSFER MECHANISM FOR
A MACHINE TOOL
Arthur F. Pekrul, New Britain, Conn., assignor to The
New Britain Machine Company, New Britain, Conn.,
a corporation of Connecticut
Filed Nov. 10, 1958, Ser. No. 773,032
8 Claims. (Cl. 214—1)

My invention relates to an automatic machine tool and to means for automatically loading workpieces into the tool and for removing finished workpieces from the tool.

It is an object of the invention to provide an improved device of the character indicated.

It is another object to provide an improved device of the character indicated applicable to a multiple-station automatic machine, that is, one in which workpieces may be simultaneously loaded into a plurality of working stations and in which, after working, these pieces may be simultaneously picked off as finished pieces from said working stations, while fresh unworked pieces are being loaded.

It is also an object to provide improved work-feed means operative in conjunction with a device meeting the above objects.

It is a specific object to meet the above objects with mechanism functioning from purely rotary motion, and developing a cyclical sequence of ouput motion used for work transfer, said sequence being characterized by a first phase of essentially rectilinear motion, a second phase of essentially rotary motion, and a third phase of essentially rectilinear motion.

It is a specific object to meet the above objects with a work-loading and work pick-off device applicable to a multiple-spindle chucking machine, wherein cylindrical workpieces are to be accurately positioned and chucked for precision-boring operations concurrently at each of two stations, there being but a single operation required for loading both stations simultaneously, and a single operation for picking off finished work from both stations simultaneously.

Other objects and various further features of novelty and invention will be pointed out or will occur to those skilled in the art from a reading of the following specification in conjunction with the accompanying drawings. In said drawings, which show, for illustrative purposes only, a preferred form of the invention:

FIG. 1 is a view in end elevation showing a two-spindle boring machine to which my invention has been applied, the aspect being toward the work-supporting ends of the spindles, and certain parts being broken away and shown in section in order to reveal internal details of construction;

FIG. 2 is a fragmentary plan view of part of the structure of FIG. 1 with certain parts again being broken away in order to reveal internal details;

FIG. 3 is a side elevation of the structure of FIGS. 1 and 2, with certain parts broken away and shown in section;

FIG. 4 is a fragmentary rear-end elevation of parts shown in FIG. 2, as viewed from the aspect 4—4 of FIG. 2;

FIG. 5 is an enlarged fragmentary detail view of detent mechanism used in the pick-off device of my invention;

FIG. 6 is a view in elevation of work-feeding mechanism at the left side of FIG. 1;

FIGS. 7 and 8 are fragmentary detail views taken in the sectional planes designated 7—7 and 8—8 of FIG. 1;

FIG. 9 is a graphical representation of the relative timing of events in an automatic cycle of operation of my machine; and FIG. 10 is a simplified fragmentary electrical control diagram for certain of the control elements in my machine.

Briefly stated, my invention contemplates work-loading and work-pick-off means in particular application to an automatic machine tool having a plurality of working stations in spaced relation on the machine frame. The work-loading device is movably supported by the frame and includes separate work-supporting means provided in plurality and relative spacing in accordance with the plurality and relative spacing of the working stations. The loading device is supported for movement in a reciprocating cycle from a first or chucking position (in which the separate work supporting means are in work-transferring register with the work-chucking means at the working station) to a second load or pick-up position (in which the separate work-supporting means are removed from the area of the working station and are in position to pick up new work pieces for the next loading operation).

For finished work pieces, a work pick-off device is similarly constituted and supported for movement at a location spaced from the work-loading device, and it, in turn, includes separate work-supporting means properly spaced for register with the working stations when in a third position. The pick-off device is movable to a fourth or discharge position at which the work-supporting means thereof are in an area removed from the area of the working station and also removed from the area of the work-loading device. Means are provided to synchronize the operation of the work-loading device and of the work-pick-off device with an automatic cycle of operation of the machine, the synchronization being preferably such as to interlace the presence of these devices as closely as possible in the chucking or working area, so as to optimize the useful working cycle of the machine.

In the form to be described, automatic work-feeding means are provided to enable automatic pick-up of workpieces by the work-loading device. Further means are also provided for automatic discharge of finished workpieces removed from the working area by the pick-off device, and if desired, an automatic-gaging operation (not shown) may conveniently be incorporated as each plurality of finished workpieces is transferred to the automatic-discharge means.

Referring to the drawings, my invention is shown in application to a two-spindle precision-boring machine having a frame 10, in which two spindles 11—12 are journalled for rotation on spaced parallel axes, the orientation in the form shown being such that the spindles 11—12 are horizontal and in the same horizontal plane. Each of the spindles 11—12 is provided at the front end of the machine with suitable chucking means, as shown at 13 in FIG. 3 for the case of the spindle 11. In the form shown, a workpiece 14, upon which precision internal-boring operation are to be effected on axially spaced bushings 15—15', is a ring gear of cup-shaped configuration and characterized by a large diameter cylindrical surface 17, which is utilized for chucking purposes, the bushings 15—16 being mounted within the hub portion 16 of the workpiece 14.

Drive to the spindles 11—12 may be conventional, and it is suggested in phantom outline at the rear end of the spindle 11 in FIG. 3, wherein belt means 18, run from a suitable motor (not shown), drives pulley means 19 on spindle 11. Similarly, a phantom outline 20 suggests suitable chuck-actuating means for the chuck 13, it being understood that each of the spindles 11—12 is similarly equipped and similarly driven.

In accordance with the invention, a work-loading device or arm 25 and a work pick-off device or arm 26 are so constituted as to automatically simultaneously load both spindles 11—12 with new workpieces and, in suitable synchronism therewith, to automatically simultaneously remove from the working stations 11—12 finished pieces of work for transfer to suitable work-discharge means, designated generally 27 at the right-hand end of the device as viewed in FIG. 1. Automatic feeding means, designated generally 28 at the left-hand end of FIG. 1, is particularly suited to supply the work-loading device or arm 25. During normal operation of the machine for the boring operations to be performed at the spindles 11—12, both the arms 25—26 are in their actuated positions in which they are removed from the working areas of spindles 11—12; however, for purposes of illustration of the operation of these elements, the pick-off arm 26 is shown in its removed position, and the work-loading arm 25 is shown in its load-transferring or chucking position, in alignment with the spindles 11—12.

Each of the devices 25—26 is pivotally mounted and actuated by its own shaft, the arm 25 being clamped to the shaft 30 and the arm 26 being clamped to the shaft 31. The clamping mechanism is shown to comprise a strap or bar 32 secured by bolts 33 to the mounting hub 34 of the arm 25 and across a flat 36 milled off the front end of the shaft 30. The hub 37 for the arm 26 is similarly fashioned and secured by means of the strap or bar 38, but in FIG. 1 these parts have been for the most part broken away so as to reveal further details regarding the actuating mechanism to be described.

The work-loading device 25 is shown to be generally triangular and to comprise separate work-supporting means designated generally 39—40, in axial alignment with the spindles 11—12 when the device 25 is in the position shown in FIG. 1; this will be known as the first or chucking position. The work-loading device 25 is movable from this first position about the pivot axis of shaft 30 and into a second position, involving counterclockwise movement in the sense of FIG. 1 through approximately 90° until such time as the work-supporting means 39—40 are in alignment with two spaced work blanks, designated generally 41—43 in the succession 41—42—43—44—45 supplied by the work-feeding means 28.

Referring particularly to FIGS. 3 and 5, the work-supporting means, such as the means 39, are seen to comprise a cylindrical or annular body 46 supporting a plurality of angularly spaced work-supporting detent fingers 47, suitably formed for resilient or snap-action engagement with an undercut edge, as at 48, within the bore of the cup-shaped workpiece 14. A shoulder 49 on the body 46 defines a limit or stop for engagement with the outer limit or end of the workpiece. The detent member 47 is shown to comprise a finger or arm having a front cam edge or slope 50 to engage under the outer limits of the bore of the workpiece. Said finger 47 is pivotally held at 51 to the body 46 and is continuously urged by spring means 52 to an outer position limited by the head of a stop bolt 53. Adjustable means 54 provides control over the strength of the detent action at fingers 47, as will be understood.

In accordance with a feature of the invention, the work-supporting means 39—40 on the work-loading arm 25 becomes automatically engaged with new workpieces, as at 43—41 in FIG. 1, when in the so-called second or pick-up position at feed means 28. Such engagement involves an axial displacement of the work-supporting means 39 into the workpieces. After indexing into the first or chucking position, disengagement (in the spindle chucking position) is also accompanied by axial withdrawal of the work-supporting means 39. Of course, between these two axial movements, involving pick-up and removal of the workpiece, a substantial angular movement or displacement is effected by the work-loading means 25. It is a feature of the invention that such axial and angular displacements are all derived from the same simple limited angular driving displacement of means which will now be described.

As best shown for the case of the shaft 31 in FIG. 1, each of the shafts 31—30 carries a follower member 55—56, shown to include a reduced portion 57 passing through a diametrically extending hole in the shaft 31 and permanently secured as by the nut 58. The follower members 55 is preferably of spherical configuration and has angularly located engagement with a cylindrical hole 59 in a crank arm 60. The crank 60 is keyed to a driveshaft 61, supported in the frame 10 in spaced bearings 62—63, and driven in limited angular displacement by suitable motor means 64; motor 64 may be a commercial fluid-operated rotary power device under the control of suitable actuating means, such as a solenoid valve 65. In similar manner, another angular displacement motor 66 under the control of actuating means 67 may govern the angular displacement of a crank arm 68 for the follower 56.

For purposes which will later be more apparent, limited freedom of radial movement of the point of engagement of crank 60 with the follower 55 is provided along the radial axis of crank 60. In the form shown, this is achieved by forming the crank 60 in two parts. The inner part or block 69 is the part keyed to the driveshaft 61, and the outer part 70 is the part having engagement with the follower 55. Parts 69—70 have freedom for limited angular movement on radially elongated guide means 71, and are spring urged by means 72 toward one limit of such movement (see FIG. 2).

In FIG. 2, the internal parts of the crank 68 are shown in greater detail than those of the crank 60. However, the internal parts are given the same numbers as employed in FIG. 1 for the crank 60, because they are duplicates of each other, primed notation being employed for the parts of crank 68.

Rotary actuation of crank 60 by the motor means 64 involves displacement from the position shown in FIG. 2 in dotted outline, which may be said to be on the alignment axis 73, counterclockwise through substantially 240° to the alignment axis 74. In like manner, rotary actuation of crank 68 by motor means 66 involves displacement from the position shown in solid outline in FIG. 2 (namely, orientation on the axis 75), counterclockwise through substantially the same angle, to the axis 76. The position shown in FIG. 2 for the crank 68 is the position previously described as the so-called first or chucking position, and upon displacement of the alignment axis 76, the second position is assumed. Similarly, the position shown in FIG. 2 in dotted outline for the crank 60 will be termed the fourth position (i.e. on alignment axis 73), and when positioned on the alignment axis 74, the third position will have been achieved.

Various limit switches, designated LS–A, LS–B, LS–C, and LS–D, are carried by the frame and include suitably positioned probes engageable with the outer end of each of the cranks 60—68. For the positions shown in FIG. 2, the outer end of crank 60 has actuated the limit switch LS–B, leaving the limit switch LS–A unactuated; in the same manner, the outer end of crank 68 has actuated the limit switch LS–D leaving the limit switch LS–C unactuated.

With the structure thus far described, it will be appreciated that the rotary displacement between axes 75—76 for the crank 68 will involve a first phase of essentially 60° of crank rotation, in which the primary resulting displacement of the shaft 30 is an axial displacement in which the loading arm 25 is projected axially away from the front face 10′ of the machine, and that this phase is followed by substantially 120° of angular movement of the crank 68, which is translated into substantially 90° of angular movement of the shaft 30, thus displacing the loading device 25 from the first position shown in solid outline in FIG. 1 and clockwise to a position in which the work-supporting means 39—40 are in alignment with new workpieces 41—43 to be picked up from the feed means 28. The remaining 60° of movement of the crank arm 68 involves essentially axial displacement of the shaft 30 back inwardly toward the front face 10' of the machine.

In accordance with a feature of the invention, I provide angular locating means effective during the initial and final axial-movement phases of operation of the crank 68 to hold each of the two possible angular positions of the work-loading device 25. Such locating means in the form shown involves coacting parts carried by the shaft 30 and by the frame, as shown in detail in FIGS. 2, 3 and 4. For the so-called first position shown, a follower comprising a roll 80 (at the end of an arm 81 keyed at 82 to the shaft 30) engages precision-located guide means 83—83' secured to the frame 10. The arm 81 is secured to the shaft 30 by means of nut 84, threaded to the reduced end of shaft 30. To assure non-fouling entrance of the follower roll 80 within the ways 83—83', the mouth of one wall defining the ways 83—83' is preferably divergent, as indicated at 85. The ways 83—83' may be precision located with reference to the frame, as by adjustment of a securing bolt 86 and spacer screws 87—88, as will be understood.

In like manner, for locating the so-called second position of work-loading device 25, precision locating ways or guide means 89—89' are positioned at right angles to the ways 83—83' about the axis of the shaft 30; and the position of the follower roll 80 when located by the ways 89—89' is suggested by lightly dashed outline 80' in FIG. 4. Means 90—91 for the precision location of ways 89—89' are similar to the corresponding means 86—87—88 described in connection with the ways 83—83'.

It will be understood that angularly spaced precision locating ways similar to those described at 83—83' and at 89—89' for the shaft 30 are also provided for the precision location of shaft 31 in each of its extreme positions, namely, the third and fourth positions described above. Such locating ways for the case of the shaft 30 are merely suggested by dashed outline 93 in FIG. 2 for coaction with locating follower roll 94.

For the particular cup-shaped workpieces 14—41—42—43—44—45 used in the presently described employment of the invention, it is convenient to provide the work-feeding means 28 as a gravity-operated track. In this track, spaced ways locate the outer diameter of the workpieces, and side-retaining plates or walls 97—98 and 99—100 serve the ways 95—96, respectively; the spaced relation of these parts is also evident in FIG. 6 and in the fragmentary bottom right corner of FIG. 2.

The course of the ways 95—96 may be generally downward to permit gravity feed, and a zig-zag offset in the ways 95—96 intermediate the pick-off stations for parts 41—43 is so devised as to properly align the workpieces 41—43 for pick-up simultaneously by the work-supporting means 39—40 when the loading arm 25 is in the so-called second position. To facilitate axial removal of the workpieces 41—43 under such circumstances, the retaining wall or plate 97 is cut away at 101—102, and the retaining wall or plate 99 is cut away at 103—104.

Detent members 105 lightly resiliently hold the part 43 in place, awaiting pick-off by the work-supporting means 39, and similar detent means 106 serves the workpiece 41. In FIG. 7, the detent member 106 is seen to comprise a simple arm pivoted at 107 to a bracket 108, which, in turn, is secured to the plates 97—99, as the case may be. A spring 110 normally urges the detent arm 106 to the position shown in FIG. 7, wherein the workpiece 41 is lightly held in place. Preferably, the spring action attributable to means 110 on arm 106 is relatively weak compared with the holding action of the spring fingers 47 of the work-supporting means 39—40; thus, upon axial insertion of the work-supporting means 40 into the bore of the workpiece 41 (and of the work-supporting means 49 into the bore of the workpiece 43), a sufficiently positive hold will have been established on the workpieces 41—43 to effect their removal against the action of the detents 105—106, as will be understood. Of course, when the workpieces 41—43 have been transferred to the chucking means at each of the spindles 12—11, respectively (so-called first position), chucking action will be positive and sufficiently strong that subsequent axial withdrawal of the loading arm 25 and therefore of the work-supporting means 39—40 will cause the spring fingers 47 to readily disengage themselves from the workpieces, thus allowing the work-loading arm 25 to be indexed clear of the working area and to be re-positioned in readiness to pick up successive workpieces (so-called second position).

In the form shown, stop fingers 111—112 provide assurance that the uncollected workpieces 44—45 and 42 will not drop into the work-transfer positions of the means 28 while the workpieces 41—43 are being picked off by the arm 25. Each of the stops 111—112 may be separately actuated by suitable means 113—114 into clearance relation with the adjacent workpiece which it has arrested, so that when the way is clear for successive workpieces to drop down into their new positions, actuation at 113—114 may assure proper timing. The timed actuation of these members will be covered in the overall description of a cycle of operation.

To complete the description of the parts, it will be observed that the work pick-off device 26 is actuated similarly to actuation for the loading device 25, and that it is similarly equipped at 115—116 (FIG. 1) with work-supporting means engageable by detent action (as shown at 47 in FIG. 5) with the bores of finished workpieces, such as the workpieces 14—14' at the spindle stations 11—12. Such engagement occurs when the pick-off arm 26 is in the so-called third position, whereafter the shaft 31 is projected axially outwardly to withdraw the workpieces from the chucking positions and to transfer them to the position shown in full lines in FIG. 1 (the so-called fourth position).

In the so-called fourth position, I provide latch means 117—118 at diametrically spaced locations and poised to intercept a completed workpiece, such as the piece 41' (see FIG. 1) transferred by the work-supporting means 116 from the spindle 12. Similar latch means, as at 119, engages a further finished workpiece 43' picked off by the work-supporting means 115, upon axial insertion of the pick-off device 26 when in the fourth position shown. In this position, both workpieces 41'—43' may be gaged by suitable means (not shown). Upon subsequent axial projection of the shaft 31 away from the front face 10' of the machine, the latch means 117—118—119 positively retains the finished workpieces 41'—43', thus forcing the detent fingers 47 (of the work-supporting means 115—116) to resiliently ride off the workpieces 41'—43'; and allowing the latter to roll freely downwardly onto suitably inclined discharge ways or chutes, designated generally 120—121. It will be understood that suitable retaining walls are provided in the ways 120—121 to engage and support the workpieces 41'—43' in a rolling position in generally the manner described and shown in connection with the work-feed means 28, and that after the ways 120—121 have conveyed the finished workpieces out of the working area of the machine, the finished pieces may be suitably collected, as in a tote tray.

The latch means 117 is shown in detail in FIG. 8, wherein it is seen to comprise a latch member 125 pivotally supported at 126 on a frame member, such as the plate 127. Spring means 128 normally urges the latch member 125 against a stop 129 and into the position shows. A suitably beveled face 130 assures that upon insertion of a newly completed workpiece suggested at 131, the latter will displace the latch member 125 in the clockwise direction until it has cleared the back edge of the inserted workpiece. Thereafter, the latch 125 will snap into the position shown, and upon subsequent axial projection of the shaft 31 away from the front face 10' of the machine, the back edge of the workpiece will be intercepted by the latch 125 so as to prevent its axial removal, and it will be temporarily retained in the position shown by outline 131' in FIG. 8. The completed workpiece is then free to roll away on one of the ways 120—121, as discussed above.

A typical operating cycle of my machine can perhaps best be understood by reference to FIG. 9, which is a chart illustrating the relative timing of important events in the operation. These events include tool feed for which I have not considered it necessary to provide any illustration, this being a well understood part of an automatic multiple-spindle boring machine, as of the type described in Patent No. 2,659,961, dated November 24, 1953, it being merely sufficient to designate that the tool feed is provided by a cam having jump-feed, slow (or cutting) feed, and quick-return phase, as suggested by legend on curve $a$ of FIG. 9. Likewise, spindle clutching and braking functions whereby the spindle is started and stopped to enable working, chucking, and unchucking, respectively, are also not shown in the drawings, but are merely suggested by curve $b$ wherein the start and stop phases are labeled. As indicated generally above, the chuck-actuating means 20 may be of conventional design, although, of course, the chuck jaws at 13 will have to be specially devised in accordance with the particular dimensions of the workpiece 14 to be chucked. It suffices for present purposes merely to refer to curve $c$ of FIG. 9 wherein chuck-closing and opening functions are designated in relation to the total cycle.

In order to assure that chucking will always be accurately accomplished by firm, clean seating on the chuck jaws, I prefer to introduce a blast of air at the chuck-seating surfaces just prior to introduction of the workpiece into the chuck, and during the chuck-closing operation. This may be performed by a solenoid-operated valve on a compressed air line, and the timing of this function is suggested by the curve $d$ of FIG. 9. It will be understood that chuck cleaning is necessary only in connection with operation of the work-loading arm 25, and for this purpose, a flexible compressed air line 133 is shown connected to a distributor head 134 secured to the outer end of the shaft 30. A T-fitting 135 is also connected to the distributor head 134 so as to provide a first supply of air in line 136 to the work-supporting means 39 and in line 137 to the work-supporting means 40. In each case, an elbow fitting, as at 138, provides an axial connection to the work-supporting means (39) for communication to blast nozzles 140 formed in the body 46, as will be understood.

Reference is made to curves $e$ and $f$ of FIG. 9 wherein actuations of the loader arm 25 and of the pick-off arm 26 are indicated. It will be noted that these actuations follow each other in quick sequence and that they may in part overlap for close interlacing, the important point being that actuation cycles for arms 25—26 are complete before the machine is re-started in its normal working cycle. Actually, for utmost compression of the cycle of operation; the spindle could be started as soon as the chucks have closed; and detents 47 have been disengaged; however, I indicate my preference that, for safety purposes, the arms 25—26 be clear of the working area, namely, in the so-called second and fourth positions.

To complete the description of programming functions, reference is made to curves $g$, $h$, and $i$ of FIG. 9. In curve $g$, limit switches LS–B and LS–C determine the "All-Clear" condition of the work-transfer arm 25—26 (namely, assurance that they are in the second and fourth positions, respectively); this "All-Clear" condition is seen to occur just as the loader arm 25 returns to the second position and to extend until the pick-off arm 26 just begins to leave the fourth position. In curve $h$ limit switches LS–A and LS–D are shown set to close the actuating circuit for the stop actuators 113—114 of the work-feed means 28, the basic actuation occurring only after the loading arm 25 has begun to move out of its second position (bringing with it new workpieces 41—43), and after such workpieces have safely axially cleared the feed means 28.

In FIG. 10, a simple control circuit is shown operated from line $L_1$—$L_2$, and inlvolving relays CR–1, CR–2, CR–3 and CR–4, limit switches LS–C and LS–D being shown to be of the double-pole variety. The normally closed limit-switch contacts at LS–B and LS–C–2 are connected to the control circuit for a shut-down relay CR–3, and the normally open limit-switch contacts at LS–B and LS–C–1 are connected in series to a safety-run relay CR–1. The circuits to both these relays CR–1, CR–3 are otherwise completed by contacts T–1 of a programming device, not shown, but understood to be operative in synchronism with the program cycle indicated by the curve $i$ of FIG. 9. Normally open contacts CR–1–1 of the safety-run relay CR–1 provide separate control of a spindle-start relay CR–2, and the normally open limit-switch contacts at LS–A and LS–D–1 are connected in series with the coil of a work-feed relay CR–4, which will be understood to be in actuating relation with the means 133—114 of FIG. 1. Circuit connections to actuate solenoid valves 67—65 for the motors 66—64 are shown to be operated by further programmer or timer contacts T–3, T–4, the timing being such (as indicated at FIG. 9, curves $e$ and $f$) that contacts T–3 close to operate the loader arm 25 from its retracted or pick-up position (at work-feed means 28) to its chuck-load position (solid outline in FIG. 1) and that the opening of contacts T–3 returns the loader arm 25 to its normal retracted position at work-feed means 28; it will also be understood that the timing for contacts T–4 is such that closure of contacts T–4 results in operation of pick-off arm 26 from its retracted or discharge position (solid outline in FIG. 1) to its pick-off position (at spindles 11—12), and that the opening of contacts T–4 returns the pick-off arm 26 to its normal retracted position at the work-discharge location.

The operation of the circuit of FIG. 10 will be seen to be such that if the arms 25—26 are in the "All-Clear" condition, both limit switches LS–B and LS–C will be operated to close their normally open contacts. This will establish a circuit to the safety-run relay CR–1 only if this condition occurs during that part of the cycle controlled by programmer contacts T–1 and indicated by curve $i$. Now, if it should happen that for one reason or another the crank arms 60—68 should not be operated through their full rotary displacement, meaning that the arms 25—26 have not been sufficiently displaced and located for the "All-Clear" position, then one or the other or both of limit switches LS–B, LS–C will not be actuated while the timer contacts T–1 have been closed. This will establish a condition in which a completed circuit is made to the coil for the shut-down relay CR–3, which will be understood to shut off power, to declutch a camshaft, or otherwise effectively to disable the machine and prevent it from going through its normal working cycle, until such time as the trouble has been spotted and rectified. Of course, if limit switches LS–B and LS–C are always properly actuated when the timer contacts T–1 are closed, no trouble will be encountered, and the safety-run relay maintains control. In the form shown, contacts CR–1–1 of the safety-run relay are held closed to excite the spindle-start relay CR–2, assuring that the spindle will be started through the program indicated at curve $b$ of FIG. 9, only if the limit switches LS–B and LS–C are properly closed; once the spindle has been started, it will be understood the hold-in and other control circuits therefor (not shown) will assume control until the working part of the cycle is completed.

As far as limit switches LS–A and LS–D are concerned, only one of these is, strictly speaking, necessary for proper timing of the work-feed relay CR–4. However, I indicate my preference that both these limit switches be connected in series as shown in FIG. 10 to provide an additional check on the attainment of the other extreme angular limit for both the crank arms 60—68, as will be understood. Interlock control circuits through programmer contacts T-2 (similar to contacts T-1, but programmed as shown in curve j), are provided in connection with limit switches LS-A and LS-D for operating the shut-down relay CR-3. Thus, if either or both limit switches LS-A and LS-D fail to operate for the third and first positions, and during the program of contacts T-2, the shut-down relay CR-3 will function; a constant check is thus provided on the proper operation of these limits of movement of the crank arms 60—68.

At the start of a cycle of operation, namely, for the zero-degree origin in FIG. 9, the loading arm 25 will be just starting from the so-called second position, having just been engaged and latched by detent action at 47 with each of the workpieces 41—43. The angular displacement motor 66 will have just been actuated to axially project the shaft 30 out of locating alignment with the ways 89—89', and when the follower roll 80 clears the end of these ways, the shaft 30 is rotated 90° to the so-called first position, shown in full solid lines in FIG. 1. Upon approach to the chucking means at each of the stations 11—12, the programming device will have actuated the chuck-cleaning air blast so as to clear the chuck seats, for clean accommodation of the newly inserted workpieces 41—43. The programming device then operates in accordance with curve c to close the chuck, and the operating cycle for angular displacement motor 66 concludes with axial retraction of the loading arm 25 and angular displacement back to the so-called second position and into latched relation with the next available workpiece.

While this operation of arm 25 was taking place, and after the workpieces 41—43 had sufficiently cleared the feed means 38, the actuators 113—114 cleared the way for new workpieces 42—45 to drop down into the positions shown at 41—43 in FIG. 1.

The programming device is next effective (in accordance with the scheduling shown for curves a and b) to start the spindle, and the cam program for the working tools. At the end of the cutting phase of the cycle, the tools are retracted in accordance with curve a, the spindle is stopped in accordance with curve b, and the chuck is opened only after the pick-off arm actuator 64 has brought the arm 26 into latched engagement by work-supporting means 115—116 with the finished workpieces. The workpieces are thus released so that upon immediate return of the pick-off arm from the pick-off position (so-called third position, in registry with the spindle locations 11—12) to the so-called fourth position (shown in full lines in FIG. 1), the finished workpieces 41'—43' may be latched to the discharge chute 120—121. These finished pieces 41'—43' will remain in position until completion of the next cycle, at which time the pick-off arm 26 is again called upon to swing over to the pick-up position in alignment with spindles 11 and 12; in proceeding into this pick-up position, the initial axial displacements of shaft 31 away from the front face of the machine 10' will effect release of the finished workpieces 41'—43', so that they may roll by gravity into suitable collecting means.

It will be seen that I have described an improved device having particular application to a fully automated operation of a multiple-spindle machine of the character indicated, wherein working operations are simultaneously performed on work supported at plural stations of the machine. The loading phase and the pick-off phase, serving the work supplied to and taken from these multiple spindles, are efficiently accomplished by single means in each case, and the geometrical lay-out of the work-transfer parts and their manner of actuation is such as to achieve utmost precision in placement of the parts and a minimum consumption of cycle time for loading and unloading purposes. Adequate safety provision is made for shut down of the machine should the work-transfer mechanism fail to proceed through its full cycle at either limit of intended travel thereof.

While I have described the invention in detail for the preferred form illustrated, it will be understood that modifications may be made within the scope of the invention as defined in the claims which follow.

I claim:

1. In a machine tool, a frame, a spindle journalled for rotation on an axis on said frame, work-chucking means at one end of said spindle, a work-loading device keyed to a pivot shaft axially movably and pivotally supported by said frame on an axis parallel to but offset from said spindle, said work-loading device including work-supporting means in axial alignment with said spindle when in a first position representing one limit of angular movement of said work-loading device, means for moving said work-loading device between said first position and a second position in which said work-supporting means is removed from the working area of said spindle, said last-defined means including a follower member fixedly carried by a part of said shaft and projecting radially therefrom, and an actuating crank journalled for rotation in said frame about an axis perpendicular to said shaft axis, said crank engaging said follower member, and means for driving said crank about its axis of rotation whereby said follower member is driven axially to axially shift said shaft and is also driven angularly about the shaft axis to produce an angular index of said work-loading device.

2. A machine tool according to claim 1, in which locating means coacts between said shaft and said frame to locate said first and second angular positions, said locating means being engaged upon axial movement of said shaft near a limiting end of angular movement of said work-loading device.

3. A machine tool according to claim 2, in which said crank includes a follower-engaging member radially slidable with respect to the crank axis, whereby said crank may have free angular movement while said shaft is located by said locating means.

4. In a machine tool, a frame, a spindle journalled for rotation on an axis in said frame, work-chucking means at one end of said spindle, a work-loading device pivotally supported by said frame with freedom for axial movement on an axis offset from and parallel to said spindle axis and including work-supporting means in axial alignment with said spindle axis when in a first position representing one limit of angular movement of said work-loading device, means for axially and pivotally moving said work-loading device between said first position and a second position in which said work-supporting means is removed from the working area of said spindle, said last-defined means limiting movement of said work-loaidng device essentially to axially outward displacement at said first position followed by essentially pivotal movement to substantially said second position and then followed by essentially axially inward displacement at said second position, work-feed means including means positioning a new piece of work in register with said work-supporting means when in said second position, a pick-off device pivotally supported by said frame with freedom for axial movement on a second axis offset from and parallel to said spindle axis and including work-supporting means in axial alignment with said spindle axis when in a third position representing one limit of angular movement of said pick-off device, means for axially and pivotally moving said pick-off device between said third position and a fourth position in which said pick-off device is removed from the working area of said spindle and from said work-loading device, said last-defined means limiting movement of said work pick-off device essentially to axially outward displacement at said third position followed by essentially pivotal movement to substantially said fourth position and then followed by essentially axially inward displacement at said second position, work-discharge means in alignment with said work-supporting means when in said fourth position, said work-supporting means of said work-loading device including means having detent engagement with a piece of work, whereby when the work is inserted in said chucking means by said work-loading device and said chucking means is actuated to clamp the work, subsequent axial movement of said work-loading device away from said chucking means disengages the same freely to permit working access to the chucked piece of work.

5. In a machine tool, a frame, a spindle journalled for rotation on an axis in said frame, work-chucking means at one end of said spindle, a work-loading device pivotally supported by said frame with freedom for axial movement on an axis offset from and parallel to said spindle axis and including work-supporting means in axial alignment with said spindle axis when in a first position representing one limit of angular movement of said work-loading device, means for axially and pivotally moving said work-loading device between said first position and a second position in which said work-supporting means is removed from the working area of said spindle, said last-defined means limiting movement of said work-loading device essentially to axially outward displacement at said first position followed by essentially pivotal movement to substantially said second position and then followed by essentially axially inward displacement at said second position, work-feed means including means positioning a new piece of work in register with said work-supporting means when in said second position, a pick-off device pivotally supported by said frame with freedom for axial movement on a second axis offset from and parallel to said spindle axis and including work-supporting means in axial alignment with said spindle axis when in a third position representing one limit of angular movement of said pick-off device, means for axially and pivotally moving said pick-off device between said third position and a fourth position in which said pick-off device is removed from the working area of said spindle and from said work-loading device, said last-defined means limiting movement of said work pick-off device essentially to axially outward displacement at said third position followed by essentially pivotal movement to substantially said fourth position and then followed by essentially axially inward displacement at said second position, work-discharge means in alignment with said work-supporting means when in said fourth position, said work-supporting means of said pick-off device including means having detent engagement with a piece of work, whereby when the work held by said chucking means is engaged by said pick-off device and said chucking means is actuated to unclamp the work, subsequent axial movement of said pick-off device away from said chucking means removes the work from the chucking area.

6. In a machine tool, a frame, two spindles journalled for rotation on spaced parallel axes on said frame, work-chucking means at corresponding ends of said spindles, a work-loading device including an arm pivotally supported by said frame on an axis parallel to but offset from said spindles and including two separate work-supporting means fixedly carried by said arm and in axial alignment with said spindle axes when in a first position representing one limit of angular movement of said work-loading device, means for reciprocably pivotally moving said work-loading device between said first position and a second position in which said two work-supporting means are removed from the working area of said spindles, a work feeding device, including guide means aligning a succession of work pieces in side by side adjacency, the size of said work pieces in relation to the course of said guide means being such that two work pieces are held in spaced relation in alignment with said respective work-supporting means when in said second position, means carried by said work-supporting means and engageable with work held by said guide means when in said second position, means carried by said work-supporting means and engageable with work held by said guide means when in said second position, said work-feed means being a generally downwardly directed guide whereby pieces of stock may be gravity-fed into second position alignment of said work-supporting means.

7. In a machine tool, a frame, two spindles journalled for rotation on spaced parallel axes on said frame, work-chucking means at corresponding ends of said spindles, a work-loading device including an arm pivotally supported by said frame on an axis parallel to but offset from said spindles and including two separate work-supporting means fixedly carried by said arm and in axial alignment with said spindle axes when in a first position representing one limit of angular movement of said work-loading device, means for reciprocably pivotally moving said work-loading device between said first position and a second position in which said two work-supporting means are removed from the working area of said spindles, a work feeding device, including guide means aligning a succession of work pieces in side by side adjacency, the size of said work pieces in relation to the course of said guide means being such that two work pieces are held in spaced relation in alignment with said respective work-supporting means when in said second position, means carried by said work-supporting means and engageable with work held by said guide means when in said second position, said work-feed means including a stop member in intercepting relation with the workpiece immediately above a work piece positioned for pick-up by said work-loading device when in said second position.

8. In a machine tool, a frame, two spindles journalled for rotation on spaced parallel axes on said frame, work-chucking means at corresponding ends of said spindles, a work-loading device including an arm pivotally supported by said frame on an axis parallel to but offset from said spindles and including two separate work-supporting means fixedly carried by said arm and in axial alignment with said spindle axes when in a first position representing one limit of angular movement of said work-loading device, means for reciprocably pivotally moving said work-loading device between said first position and a second position in which said two work-supporting means are removed from the working area of said spindles, a work feeding device, including guide means aligning a succession of work pieces in side by side adjacency, the size of said work pieces in relation to the course of said guide means being such that two work pieces are held in spaced relation in alignment with said respective work-supporting means when in said second position, means carried by said work-supporting means and engageable with work held by said guide means when in said second position, said work-feed means including a stop member in intercepting relation with the workpiece immediately above a work piece positioned for pick-up by said work-loading device when in said second position, said means synchronized with movement of said work-loading device from said second position to said first position being in controlling relation with said stop member to release successive work pieces for gravity feed into position ready for pick-up by said work-loading device on return of said work-loading device from said first position to said second position.

References Cited in the file of this patent

UNITED STATES PATENTS

| | | |
|---|---|---|
| 1,794,424 | Smith | Mar. 3, 1931 |
| 1,933,226 | Smith | Oct. 31, 1933 |
| 1,974,837 | Shillinger | Sept. 25, 1934 |
| 2,096,264 | Schutz | Oct. 19, 1937 |
| 2,811,267 | Boch | Oct. 29, 1957 |
| 2,927,343 | Soderquist | Mar. 8, 1960 |
| 2,929,499 | Turner | Mar. 22, 1960 |